(12) United States Patent
Lucka et al.

(10) Patent No.: US 8,601,984 B2
(45) Date of Patent: Dec. 10, 2013

(54) ENGINE SYSTEM AND METHOD FOR SUBSTANTIALLY NOX-FREE COMBUSTION OF A FUEL IN A COMPRESSION IGNITION ENGINE

(75) Inventors: Klaus Lucka, Aachen (DE); Dag Øvrebø, Porsgrunn (NO); Heide Pohland Vom Schloss, Herzogenrath (DE)

(73) Assignee: Cool Flame Technologies AS, Porsgrunn (NO)

( * ) Notice: Subject to any disclaimer, the term of this patent is extended or adjusted under 35 U.S.C. 154(b) by 804 days.

(21) Appl. No.: 12/675,401

(22) PCT Filed: Sep. 1, 2008

(86) PCT No.: PCT/NO2008/000311
§ 371 (c)(1),
(2), (4) Date: Apr. 20, 2010

(87) PCT Pub. No.: WO2009/028959
PCT Pub. Date: Mar. 5, 2009

(65) Prior Publication Data
US 2010/0242898 A1    Sep. 30, 2010

Related U.S. Application Data

(60) Provisional application No. 60/968,899, filed on Aug. 30, 2007.

(51) Int. Cl.
*F02B 7/00* (2006.01)
*F02M 21/02* (2006.01)
*F02M 31/00* (2006.01)

(52) U.S. Cl.
USPC ............... 123/1 A; 123/3; 123/431; 123/525; 123/527; 123/543

(58) Field of Classification Search
USPC ............. 123/1 A, 22, 26, 250, 274, 275, 288, 123/298, 304, 305, 27 GE, 431, 525–527, 123/531, 536–538, 543–544, 3, DIG. 12
See application file for complete search history.

(56) References Cited

U.S. PATENT DOCUMENTS 3,908,606 A * 9/1975 Toyoda et al. ............... 123/3
3,946,711 A * 3/1976 Wigal ........................ 123/536

(Continued)

FOREIGN PATENT DOCUMENTS

DE    10240234    3/2004
JP    07-189848   7/1995

(Continued)

OTHER PUBLICATIONS

Office Action fro JPO dated Jul. 4, 2012, filed inter alia as statement of relevance for non-english references discussed therein.

*Primary Examiner* — Thomas Moulis
(74) *Attorney, Agent, or Firm* — Christian D. Abel

(57) ABSTRACT

Engine system comprising a compression ignition engine (20) including at least one combustion chamber and a cold flame vaporizer (40) in which a fuel is partially oxidized in preheated air to form a cold flame gas. The cold flame vaporizer (40) is in fluid communication with the combustion chamber of the compression ignition engine (20). There is further provided means (50) for supplying air such that the cold flame gas can be mixed with the additional air before being injected into the combustion chamber, and means (22) for injecting a pilot fuel into the combustion chamber, thereby producing a pilot flame in the combustion chamber which ignites the mixture of cold flame gas and air. There is also provided a method for a substantially NOx-free combustion of diesel fuel in a compression ignition engine (20).

7 Claims, 2 Drawing Sheets

(56) References Cited

U.S. PATENT DOCUMENTS

Figure 1:
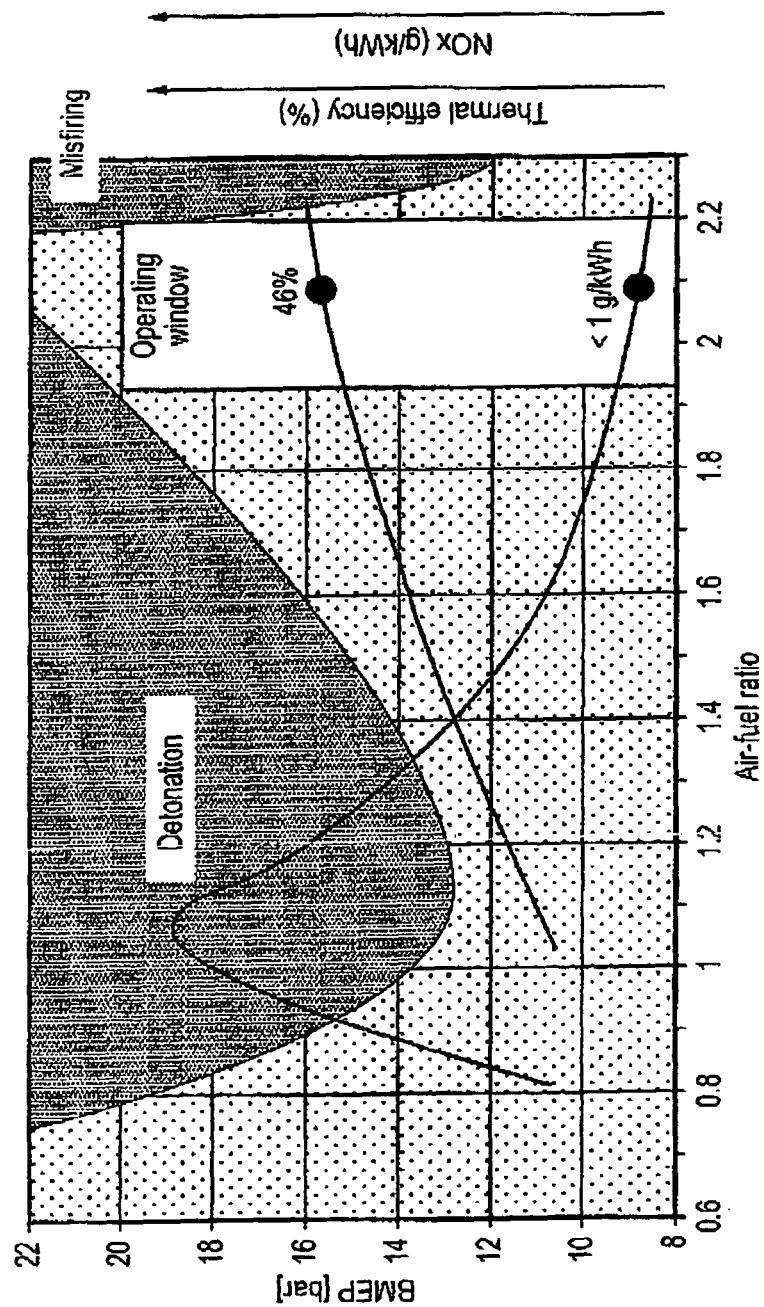

| | | | |
|---|---|---|---|
| 4,002,151 A * | 1/1977 | Toyoda et al. | 123/3 |
| 4,059,076 A * | 11/1977 | Kosaka et al. | 123/3 |
| 4,067,685 A * | 1/1978 | Brown | 431/2 |
| 4,147,136 A * | 4/1979 | Noguchi et al. | 123/3 |
| 4,267,976 A * | 5/1981 | Chatwin | 239/102.2 |
| 4,276,131 A * | 6/1981 | Feuerman | 205/342 |
| 4,335,698 A * | 6/1982 | Stephens | 123/537 |
| 4,594,969 A * | 6/1986 | Przybylski | 123/25 E |
| 4,619,240 A * | 10/1986 | Bedford et al. | 123/575 |
| 4,742,801 A * | 5/1988 | Kelgard | 123/27 GE |
| 5,231,962 A * | 8/1993 | Osuka et al. | 123/299 |
| 5,408,973 A * | 4/1995 | Spangjer | 123/478 |
| 5,992,397 A * | 11/1999 | Hideaki et al. | 123/538 |
| 6,237,576 B1 * | 5/2001 | Buccino et al. | 123/549 |
| 6,311,650 B1 * | 11/2001 | Lamm | 123/3 |
| 6,378,489 B1 * | 4/2002 | Stanglmaier et al. | 123/304 |
| 6,470,849 B1 * | 10/2002 | Duffy et al. | 123/299 |
| 6,793,693 B1 * | 9/2004 | Koehne et al. | 44/300 |
| 6,817,347 B2 * | 11/2004 | Noble | 123/536 |
| 6,866,016 B2 * | 3/2005 | Cueman | 123/299 |
| 6,947,830 B1 * | 9/2005 | Froloff et al. | 701/111 |
| 7,017,547 B2 * | 3/2006 | Mehta et al. | 123/305 |
| 7,036,482 B2 * | 5/2006 | Beck et al. | 123/229 |
| 7,373,918 B2 * | 5/2008 | Uchiyama | 123/299 |
| 7,533,650 B2 * | 5/2009 | Kim | 123/300 |
| 2005/0019551 A1 * | 1/2005 | Hunt et al. | 428/323 |
| 2011/0023853 A1 * | 2/2011 | Lund | 123/590 |
| 2012/0046854 A1 * | 2/2012 | Sangkyu et al. | 701/108 |

FOREIGN PATENT DOCUMENTS

| | | |
|---|---|---|
| JP | 2001-123871 | 5/2001 |
| JP | 2004-190586 | 7/2004 |
| WO | 00/06948 | 2/2000 |
| WO | 2004/025099 | 3/2004 |

* cited by examiner

ENGINE SYSTEM AND METHOD FOR SUBSTANTIALLY NOX-FREE COMBUSTION OF A FUEL IN A COMPRESSION IGNITION ENGINE

The present invention relates to an engine system with reduced NOx emissions in exhaust gas and a method for reducing the NOx content of exhaust gas. The present invention also relates to the use of a engine system and a method for substantially NOx-free combustion.

The cold flame is a phenomenon which has so far not received too much attention. In a cold flame the fuel is partially oxidized in preheated air and the temperature is kept constant at about 450° C., and it is independent of air/fuel ratio and residence time. In the cold flame process, only 2-20% of the calorific value of the fuel is released, and this heat is used to evaporate the fuel, giving a homogenous gaseous fuel. During developmental work, it has been observed that the gas was able to remove carbon deposits from the reactor walls. The reason for this has not been established yet, but is thought to be due to free radicals that are present in the cold flame gas, i.e. the partially oxidized, gaseous fuel.

A more complete description of the cold flame gas phenomenon can be found in the American patent U.S. Pat. No. 6,793,693.

Exhaust from compression ignition engines (often imprecisely called diesel engines), which operate on excess air, contains mainly particulates, NOx and incomplete combustion products (HC and CO).

NOx can only be removed catalytically if the exhaust gas is slightly reducing (as in an Otto engine). This is not normally the case in a compression ignition engine.

A known way to reduce NOx emissions in a diesel engine is to recirculate some of the exhaust back into the engine (EGR). While this works for smaller diesel engines operating on clean diesel fuel, it is not practical for larger engines operating on heavy fuel oil since it will produce particulates in the exhaust that will mix with the lubricating oil and cause premature engine wear. Attempts to insert a filter in the EGR loop has not been successful since the exhaust also contains salts and other metal compounds which will melt during filter regeneration (when the temperature is increased to above 800° C.) and cause permanent damage to the filter.

While the above method reduces the NOx formation, it is also possible to remove NOx by inserting an NOx absorbent, as described in several patent documents, for instance U.S. Pat. No. 5,974,791. An NOx absorbent can be made from barium carbonate. During absorption, the absorbent is converted to barium nitrate and releases $CO_2$ at the same time. When the absorbent is saturated, it can be regenerated using CO in that the barium nitrate is converted back to barium carbonate and release $N_2$ gas.

It is also known that NOx can be reduced using a dual fuel concept where natural gas is injected into the inlet air stream and the gas/air mixture is injected with a diesel pilot flame. Examples of this work done by Wartsila on large ship engines and Caterpillar/Clean Air Partners on truck diesel engines. Wartsila demonstrate a reduction in NOx from 12.5 g/kWh down to 1.3 kWh (see FIG. 1). The NOx level is reduced with increasing air/fuel ratio and the upper limit is around 2, limited by misfiring. Similar results have been achieved by others. While this works well for stationary applications where natural gas is readily available, it is not practical for ships due to costs associated with storing natural gas (usually as LNG). By using the cold flame technology, it is possible to achieve the same NOx reduction on a single fuel, which can easily be stored on ships.

In the article "Homogeneous diesel combustion with external mixture formation by a cool flame vaporizer" by Heike Puschmann et al., copyright SAE 2006, there is presented a study wherein a diesel fuel is vaporized in a cold flame vaporizer to form a cold flame gas which is combusted in the diesel engine. The study concludes that running the diesel engine on a mixture of cold flame gas and air reduces the formation of NOx and smoke significantly when compared to two low temperature diesel combustion strategies based on direct fuel injection; the premixed charge compression ignition (PCCI) and the late low temperature combustion (LLTC).

In this article, the objective was to form an air/fuel mixture which would self ignite upon compression. Although it is possible to find an operating point (speed and load) where this is possible, it is difficult to control and operate such an engine on varying speed and load. In the present invention, the air/fuel ratio is chosen so that the mixture does not self ignite on compression due to being too lean, same principle as in a natural gas dual fuel engine (see FIG. 1) By injecting a small amount of liquid fuel in the engine like with a dual fuel engine, the injected fuel work as a pilot flame and will ignite the premixed and compressed cold flame gas mixture. Operating the engine under such conditions will lead to a reduction in NOx emissions, similar to what can be achieved by a natural gas dual fuel engine.

In order to ensure self ignition, however, the engine presented in the article of Heike Puschman et. al. must be run on a rich fuel/air mixture, which leads to increased formation of NOx in the exhaust.

There is therefore an objective of the present invention to provide a diesel engine where the above mentioned disadvantages are reduced.

This objective is achieved by the present invention as defined in the independent claims. Further embodiments of the invention are defined in the dependent claims.

There is provided an engine system comprising
  a compression ignition engine including at least one combustion chamber,
  a cold flame vaporizer in which a fuel is partially oxidized in preheated air to form a cold flame gas, the cold flame vaporizer being in fluid communication with the combustion chamber of the compression ignition engine, and
  means for supplying air such that the cold flame gas can be mixed with the additional air before being injected into the combustion chamber.

The engine system further comprises means for injecting a pilot fuel into the combustion chamber, thereby producing a pilot flame in the combustion chamber which ignites the mixture of cold flame gas and air.

The engine system may also comprise a reformer in which the cold flame gas is at least partially reformed to form hydrogen. This will make the fuel more combustible. The reformer may be a standard reformer for reforming a hydrocarbon substance.

There is also provided a method for a substantially NOx-free combustion in a compression ignition engine including at least one combustion chamber where the method comprises the following steps:
  producing a cold flame gas from the fuel and preheated air,
  mixing the cold flame gas with additional air,
  injecting the mixture of cold flame gas and air into the at least one combustion chamber.

For the ignition of the mixture of cold flame gas and air, the method further comprises the step of providing a pilot flame in the combustion chamber by injecting a pilot fuel.

The method further comprises the step of at least partially reforming the cold flame gas to form hydrogen before injecting it into the compression ignition engine, thereby making the mixture of fuel and air more combustible.

The method further comprises the step of using the same fuel for producing the cold flame gas and the pilot flame. This means that for instance ships, carrying diesel fuel, can run their diesel engines on a cold flame gas.

There is also provided a use of the engine system wherein the fuel is diesel or heavy fuel oil.

There is also provided a use of the method for a substantially NOx-free combustion where the fuel is diesel or heavy fuel oil.

Above, only a cold flame gas produced by a cold flame vaporizer has been mentioned. A cold flame is one method to achieve a partially oxidized fuel gas among a number of other partially oxidized fuel gases with the same properties. The present invention should therefore not be seen as limited to only a cold flame gas, but should include other partially oxidized fuel gases with the same or similar properties as the cold flame gas.

In the following, an embodiment of the invention is disclosed in detail with reference to the enclosed figures where FIG. 1 is a graph illustrating the operating window for the compression ignition engine.

Figure 2:
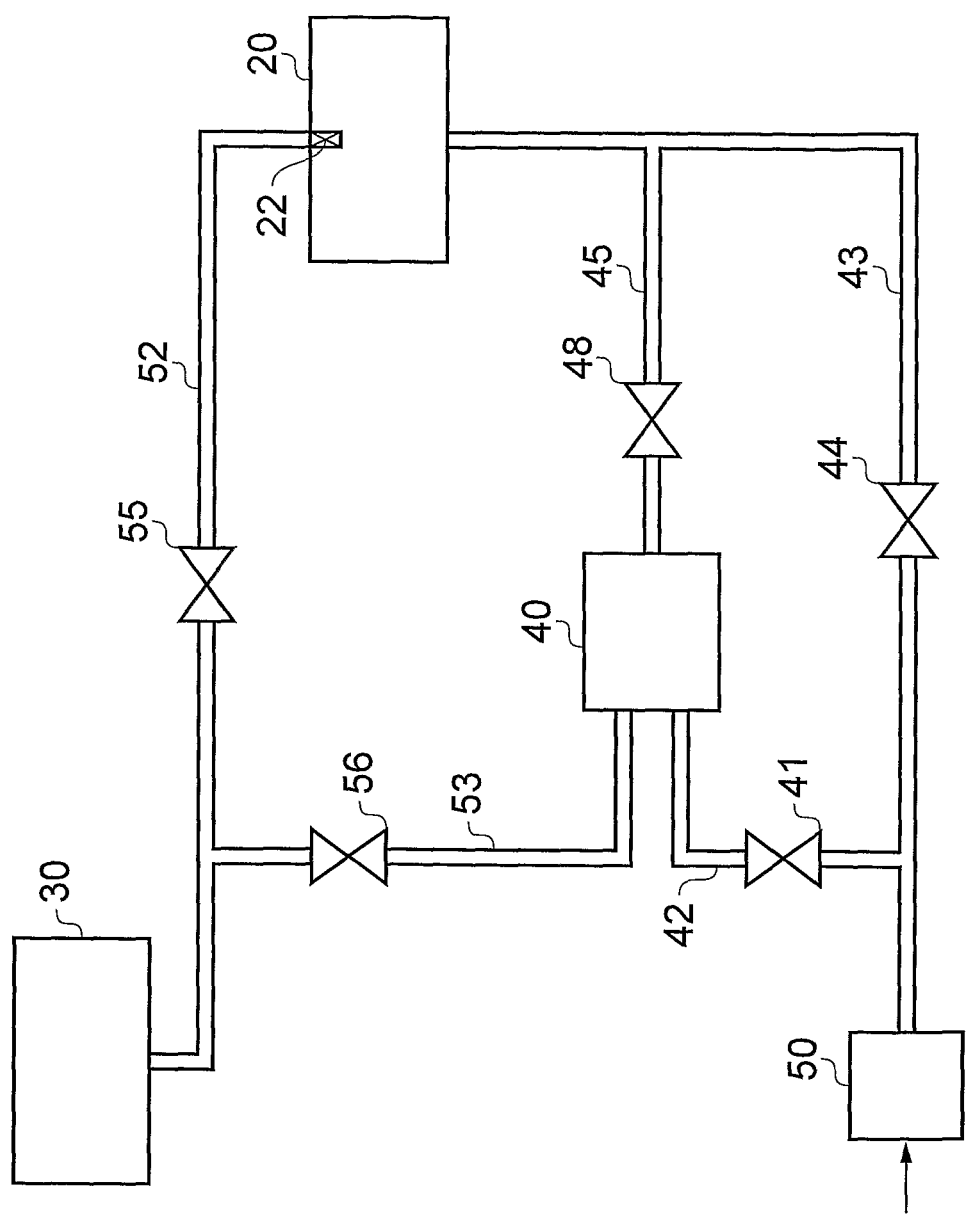

FIG. 2 schematically illustrates of an embodiment of the present invention.

In FIG. 1 there is an illustration of the work done by Wärtsilä on a large dual fuel ship engine. On this figure the operating window is illustrated where it can be seen that by providing a lean mixture of fuel and air the compression ration may be increased without self detonation or misfiring.

An embodiment of the invention is schematically illustrated on FIG. 2. A cold flame vaporizer 40 is provided in which a fuel is partially oxidized in preheated air to form a cold flame gas. The resulting cold flame gas is a gaseous, homogenously mixed fuel.

There is also provided an air supply 50 which is connected to the cold flame vaporizer through fluid line 42. Valve means 41 is provided to control the flow of air from the air supply 50 to the cold flame vaporizer 40.

There is also provided a fuel supply 30 for the supply of diesel or heavy fuel oil. The fuel supply 50 is connected to the cold flame vaporizer through fluid line 53. Valve means 56 controls the flow of fuel to the cold flame vaporizer 40.

A fluid line 45 connects the cold flame vaporizer 40 to a compression ignition engine 20. The air supply 50, or possibly a different air supply (not shown) is also connected to the compression ignition engine 20. Before being fed into the engine 20, the cold flame gas is mixed with further air from the air supply. Valve means 44 controls the flow of air to the compression ignition engine 20, while valve means 48 controls the flow of cold flame gas from the cold flame vaporizer 40 to the compression ignition engine 20.

There is also provided a fluid line 52 such that fuel from the fuel supply may also be fed directly into the compression ignition engine as a pilot flame 22. Valve means 55 controls the flow of fuel from the fuel supply 30 to the engine 20.

In the present invention the fuel is in other words used to provide a cold flame gas and to provide a pilot flame to ensure correct combustion of the mixture of cold flame gas and air.

The invention claimed is:

1. Engine system comprising
    a compression ignition engine including at least one combustion chamber,
    a cold flame vaporizer in which a fuel is partially oxidized in preheated air to form a cold flame gas, the cold flame vaporizer being in fluid communication with the combustion chamber of the compression ignition engine,
    means for supplying air such that the cold flame gas can be mixed with the additional air before being injected into the combustion chamber,
wherein the engine system further comprises means for injecting a pilot fuel into the combustion chamber such that the pilot fuel produces a pilot flame in the combustion chamber which ignites the mixture of cold flame gas and air.

2. Engine system apparatus according to claim 1,
    wherein the engine system comprises a reformer in which the cold flame gas is at least partially reformed to form hydrogen, thereby making the fuel more combustible.

3. Method for substantially NOx-free combustion of a fuel in a compression ignition engine including at least one combustion chamber, the method comprising the following steps:
    producing a cold flame gas from the fuel and preheated air,
    mixing the cold flame gas with additional air,
    injecting the mixture of cold flame gas and air into the at least one combustion chamber, wherein the method further comprises the step of
    providing a pilot flame in the combustion chamber, by injecting a pilot fuel, for the ignition of the mixture of cold flame gas and air.

4. Method according to claim 3,
    wherein the method further comprises the step of at least partially reforming the cold flame gas to form hydrogen, thereby making the mixture of fuel and air more combustible.

5. Method according to claim 4,
    wherein the method further comprises the step of using the same fuel for producing the cold flame gas and the pilot flame.

6. Engine system according to one of the claims 1-2, wherein the fuel is diesel or heavy fuel oil.

7. Method according to one of the claims 3-5, wherein the fuel is diesel or heavy fuel oil.

* * * * *